INVENTOR.
FRANK C. SUTLIFFE JR.
BY George B. White
ATTY

United States Patent Office 3,022,670
Patented Feb. 27, 1962

3,022,670
THERMO-ELEMENT
Frank C. Sutliffe, Jr., 23 Juno Road, Mill Valley, Calif.
Filed Dec. 7, 1959, Ser. No. 857,667
5 Claims. (Cl. 73—368.4)

This invention relates to a thermo element to indicate temperature of or control operations according to the temperature of flowing substances in conduits.

The primary object of the invention is to provide a thermo element for interconnection in a conduit for liquids, solids or air or other flowing substances so that the thermo-element can react to the temperature of the flowing substance without obstructing or interfering with the flow of the substance through the conduit system.

In the past a sleeve or other element was extended across the flow stream and a thermo element was inserted in the sleeve. Disadvantage of this structure was that it formed an obstruction and interfered with the flow and caused disturbance in the flow of the substances, and furthermore it detracted from the efficiency of the transmittal through the conduit system.

Novel features of the herein thermo-element include a peripheral membrane or element surrounding the flow area, and in direct contact with the flowing substance all around the conduit passage, and thermo responsive fluid surrounding this membrane in such a manner as to prevent the distortion of the membrane during changes of temperature, and a facility of securing the entire unit in a conduit casing interconnected in the conduit system in such a manner that no damages occur through distortion due to temperature changes in the liquid.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

In my device I provide a conduit section 1, the generally cylindrical ends 2 of which may be weided or otherwise secured and interconnected in a conduit system.

Figure 1:
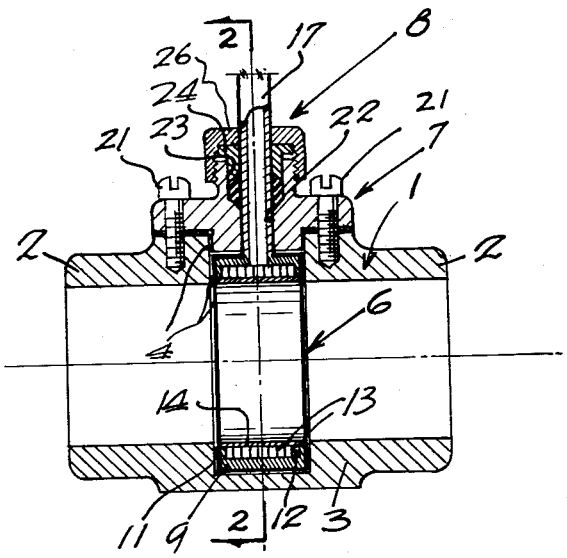
FIG. 1 is a sectional view of my device.
Figure 2:
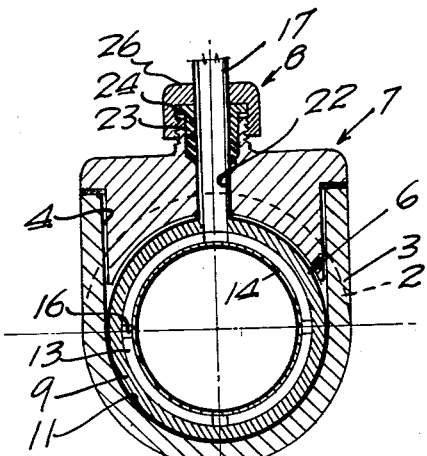
FIG. 2 is a cross sectional view of my device, section being taken on lines 2—2 of FIG. 1.

The middle portion or body 3 of my conduit section 1 is of generally U-shaped cross-section as particularly shown in FIG. 2. The top of this U-shaped cross-section is open so as to form an aperture 4 through which my thermo responsive unit 6 can be inserted into the body 3.

My thermo responsive unit is held in position and the conduit is sealed by a suitable cap device 7 and packing gland 8 in a manner hereinafter described.

Figure 3:
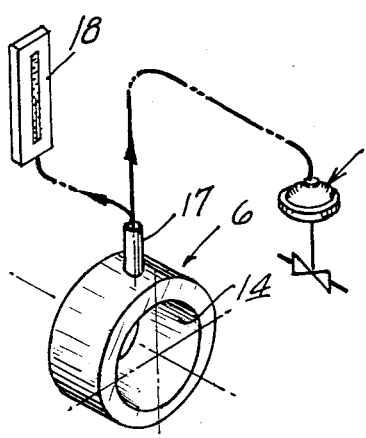
FIG. 3 is a perspective view of my device, diagrammatically indicating the connection of the device to either a thermo indicator or to a thremo control device.

My thermo responsive element 6 includes a cylindrical casing 9 which fits into a generally cylindrical recess 11 in inner periphery of the U-shaped body 3. A plurality of parallel grooves 12 are formed between ribs 13 on the inner periphery of this cylindrical casing 9 for the purpose of accommodating a suitable thermo-responsive medium such as mercury or so called "red liquid." The spaces formed in the grooves 12 are covered by a cylindrical membrane 14, which is of suitably thin material and highly heat-conductive so as to transmit heat from the substance flowing through the conduit system to the liquid in the grooves 12. The ribs 13 have suitable apertures 16 therethrough so that all the cells or grooves 12 formed inside of the casing 9 are inter-communicating. A tube 17 extends from the casing 9 in communication with the space between the cells or grooves 12 within the casing so as to transmit the variation of fluid pressure caused by temperature changes to a remote device such as a thermometer 18 or a diaphragm or other control device 19 as shown in FIG. 3.

In order to prevent distortion of the element 6 in the casing, it is suspended in position by the tube 17. The cap device 7 is secured by suitable bolts 21. Through the cap device 7 is provided a hole 22 to accommodate the tube 17. The outer end of the hole 22 is counterbored to form a pocket 23 into which fits a packing gland 24 held in place by a screw cap 26. This packing gland 24 tightens around the tube 17 so to hold it in position.

The element 6 is inserted through the opening 4, then the cap device 7 is placed over the tube 17 and is secured in place. Then the tube 17 is raised to the point where it suspends the thermo-responsive element 6 in close proximity to the boundary of the recess 9. Then the packing gland cap 26 is tightened so as to tighten the packing gland 23 around the tube 17 to hold it in adjusted position.

In operation the substance transmitted flows through the conduit system unobstructed. Its temperature is transmitted through the membrane 14 accurately and rapidly to the fluid in the space or grooves 12 between the ribs 13. The thermo-responsive fluid inside the cells or grooves 12 receives the quickly transmitted heat and transmits it to the fluid body through the tube 17 into the thermo-responsive system so as to either promptly and accurately indicate temperature on the thermometer or indicator 18, if it is so desired, to actuate the diaphragm 19 or other thermo-responsive device for operation or actuation purposes.

The device is simple in construction, inexpensive, it is of improved accuracy and it greatly improves the efficiency of thermo-responsive actuation or measurement without interference with the flow in the conduit system.

I claim:

1. In a thermo-element for a conduit system for temperature indication or temperature responsive control, a generally cylindrical casing, said casing having a cylindrical space therein to contain a thermo-responsive liquid, a generally cylindrical heat conductor membrane forming the inner peripheral wall of said casing, a tube extended from said casing and communicating with said space, and means to suspend said element in a conduit so that the inner periphery of said membrane is in registry with the inner periphery of said conduit.

2. In a thermo-element for a conduit system for temperature indication or temperature responsive control, a generally cylindrical casing, said casing having a cylindrical space therein to contain a thermo-responsive liquid, a generally cylindrical heat conductor membrane forming the inner peripheral wall of said casing, a tube extended from said casing and communicating with said space, and means to suspend said element in a conduit so that the inner periphery of said membrane is in registry with the inner periphery of said conduit, said suspension means including a packing gland through which the tube extends, and means to tighten said gland around said tube so as to support the tube and said casing in selected position.

3. In a thermo-element for a conduit system for temperature indication or temperature responsive control, a generally cylindrical casing, said casing having a space therein to contain a thermo-responsive liquid, a generally cylindrical membrane covering the inner periphery of said space, a tube extended from said casing and communicating with said space, a conduit section adapted to be secured in a conduit system including a portion with a recess therein to accommodate said casing, said conduit section having an opening from said recess adapted to permit the insertion of said element into said conduit section, a cap to cover said opening, and a packing gland in said cap engaging said tube so as to support said tube in position in said cap for suspending said element in said conduit section, so that the inner periphery of said membrane is in registry with the inner periphery of said conduit section.

4. In a thermo-element for a conduit system for temperature indication or temperature responsive control, a generally cylindrical casing, said casing having a cylindrical space therein to contain a thermo-responsive liquid, a generally cylindrical heat conductor membrane forming the inner peripheral wall of said casing, a tube extended from said casing and communicating with said space, and means to suspend said element in a conduit so that the inner periphery of said membrane is in registry with the inner periphery of said conduit, said space inside of said casing being divided into cells by generally parallel ribs, and apertures through said ribs to intercommunicate said cells together.

5. In a thermo-element for a conduit system for temperature indication or temperature responsive control, a generally cylindrical casing, said casing having a space therein to contain a thermo-responsive liquid, a generally cylindrical membrane covering the inner periphery of said space, a tube extended from said casing and communicating with said space, and means to suspend said element in a conduit so that the inner periphery of said membrane is in registry with the inner periphery of said conduit, said space inside of said casing being divided into cells by generally parallel ribs, and apertures through said ribs to intercommunicate said cells together, the said ribs extending inwardly from said outer casing into said space and being in contact with said membrane.

References Cited in the file of this patent

UNITED STATES PATENTS

| | | |
|---|---|---|
| 1,276,024 | Brittin | Aug. 20, 1918 |
| 2,025,617 | Schramm | Dec. 24, 1935 |
| 2,243,356 | Olson | May 27, 1941 |
| 2,804,773 | Domingo et al. | Sept. 3, 1957 |
| 2,848,896 | Peragallo | Aug. 26, 1958 |